United States Patent [19]

Braun et al.

[11] Patent Number: 5,093,828
[45] Date of Patent: Mar. 3, 1992

[54] METHOD OF EXCHANGING DATA

[75] Inventors: Walter Braun, Wettingen; Walter Hagmann, Suhr, both of Switzerland

[73] Assignee: Datawatt b.V., Wolvega, Netherlands

[21] Appl. No.: 494,312

[22] Filed: Mar. 16, 1990

[30] Foreign Application Priority Data

Mar. 21, 1989 [CH] Switzerland .................. 1047/89

[51] Int. Cl.$^5$ .................. H04L 12/28; H04B 3/54
[52] U.S. Cl. .................. 370/85.5; 370/85.15; 340/825.05
[58] Field of Search .................. 370/17, 85.4, 85.5, 370/85.7, 85.8, 95.1, 95.2, 85.15; 340/825.5, 825.05

[56] References Cited

U.S. PATENT DOCUMENTS

| | | | |
|---|---|---|---|
| 4,611,274 | 9/1986 | Machino et al. | 370/85.8 |
| 4,667,323 | 5/1987 | Engdahl et al. | 370/85.4 |
| 4,692,761 | 9/1987 | Robinton | 370/17 |
| 4,800,363 | 1/1989 | Braun et al. | 375/37 |

FOREIGN PATENT DOCUMENTS

| | | |
|---|---|---|
| 100668 | 2/1984 | European Pat. Off. . |
| 208872 | 1/1987 | European Pat. Off. . |
| 231457 | 8/1987 | European Pat. Off. . |
| 236558 | 9/1987 | European Pat. Off. . |
| 238813 | 9/1987 | European Pat. Off. . |
| 0120147 | 5/1989 | Japan .................. 370/85.4 |
| 2176972 | 1/1987 | United Kingdom . |

OTHER PUBLICATIONS

Global Telecommunications Conference, 1987, 15-18, Nov. 1987, Tokyo, JP, IEEE (New York, US), S. T. Vuong et al.: "Design and Implementation of the Access and Link Protocols for a Low-Cost Lan Using Electric Power Lines", pp. 1415-1421, see parags. 4-4.2.

1985 Nat'l Aerospace and Electronics Conference, May 20-24, 1985, IEEE (New York, US), N. J. Alber et al.: "A Dual Channel High Speed Fiber Optics Multiplex Data Bus System", pp. 130-135, see p. 130, right-hand col., line 12, p. 131, right-hand col., line 26.

IBM Technical Disclosure Bulletin, vol. 24, No. 9, Feb. 1982 (New York, US), C. D. Gravatte et al.: "Channel Access via Multiple Level Polling", pp. 4828-4831, see the whole article.

Primary Examiner—Douglas W. Olms
Assistant Examiner—Melvin Marcelo
Attorney, Agent, or Firm—Oblon, Spivak, McClelland, Maier & Neustadt

[57] ABSTRACT

A method of exchanging data in a network having a master station (M), at least one subscriber station and a common data channel according to a hierarchical token-passing principle comprises the following steps: a) at the start of the data exchange the master station (M) has sole possession of the control token; b) in order to initiate a data exchange the master station (M) sends a telegram with a time limit (T0L) specified by it to at least one receiver (E1); c) at least one receiver (E1) accepts the control token for a period limited by the specified time limit (T0L); d) at least one and every subordinate further receiver (E1, E2, E3) either passes the control token with a telegram and a further time limit (T1L, T2L) not exceeding the specified time limit (T0L) on to a subordinate further receiver (E2, E3), or allows the specified time limit to expire without relinquishing the control token; e) after expiry of the time limit (T0L) specified by it, the master station (M) again accepts sole possession of the control token.

10 Claims, 2 Drawing Sheets

METHOD OF EXCHANGING DATA

BACKGROUND OF THE INVENTION

1. Field of the Invention

The invention relates to a method of exchanging data in the form of telegrams in a network having a master station, at least one subscriber station and a common data channel according to a hierarchical token-passing principle with controlled assignment of a control token.

2. Discussion of Background

The published patent applications EP-0,208,872, EP-0,231,457, EP-0,236,558 and EP-0,238,813 disclose signal transmission methods which are particularly suited to data transmission on the lines of a low-voltage and/or medium-voltage system. They are distinguished in that they are matched to the time- and frequency-dependent interference characteristics of the transmission channel, which results in a greatly improved availability of individual data connections for, at the same time, a small transmitting power.

In order to realize a control system on low-voltage and medium-voltage systems, however, in addition to as interference-free a signal transmission as possible between an individual transmitter and a receiver, a method for controlling the data exchange between a plurality of subscribers is also required. In particular the location-dependent and time-dependent transmission security of the common data channel must be taken into account here.

An important point is the flexibility of the system. It should be possible to expand the network without great outlay.

SUMMARY OF THE INVENTION

Accordingly, one object of this invention is to provide a method of exchanging data in the form of telegrams in a network having a master station, at least one subscriber station and a common data channel according to a hierarchical token-passing principle with controlled assignment of a control token, which ensures a reliable data exchange over the data channel liable to location-dependent and time-dependent interference.

The object is achieved according to the invention a) in that at the start of a data exchange the master station has sole possession of the control token b) in that in order to initiate the data exchange the master station sends a telegram with a time limit specified by it to at least one receiver, c) in that at least one receiver accepts the control token for a period limited by the specified time limit, d) in that at least one and every subordinate further receiver d1) either passes as sender the control token with a telegram and a further time limit not exceeding the specified time limit on to a subordinate further receiver, d2) or allows the specified time limit to expire without relinquishing the control token, d3) or returns the control token to the sender or to the master station, e) and in that, after expiry of the time limit specified by it, the master station again accepts sole possession of the control token.

The data exchange according to the invention is distinguished by the absolute control of the master station over the data channel. Even when it temporarily relinquishes the control token to a subscriber station, it only does this for a time which it defines. At the latest after expiry of the time limit, the sole control reverts to it again.

The advantage of the hierarchical token-passing principle according to the invention is conferred by the fact that a power system set up accordingly is robust with respect to interference which temporarily halts the data exchange completely.

In order to avoid collisions during normal data traffic, the control token is preferably passed on to only exactly one receiver. In order to resolve collisions during special calls, an originally addressed receiver group is divided into a plurality of sub-groups and the control token is successively relinquished to the individual sub-groups.

In order to take account of the transmission characteristics of the data channel which vary with respect to time and location, a particularly preferred embodiment is distinguished a) in that at least one of the subscriber stations registers the telegrams it can receive and in each case a value for determining a transmission quality, b) in that at least this one of the subscriber stations notifies the master station of the transmission qualities registered, c) in that, on the basis of the transmission qualities notified to it, the master station defines at least one data route for at least one of the subscriber stations, d) and in that telegrams destined for the at least one of the subscriber stations are transmitted in accordance with the defined data route.

As already mentioned, the invention is preferably used for a control system on low-voltage and/or medium-voltage systems.

Further advantageous embodiments emerge from the dependent patent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
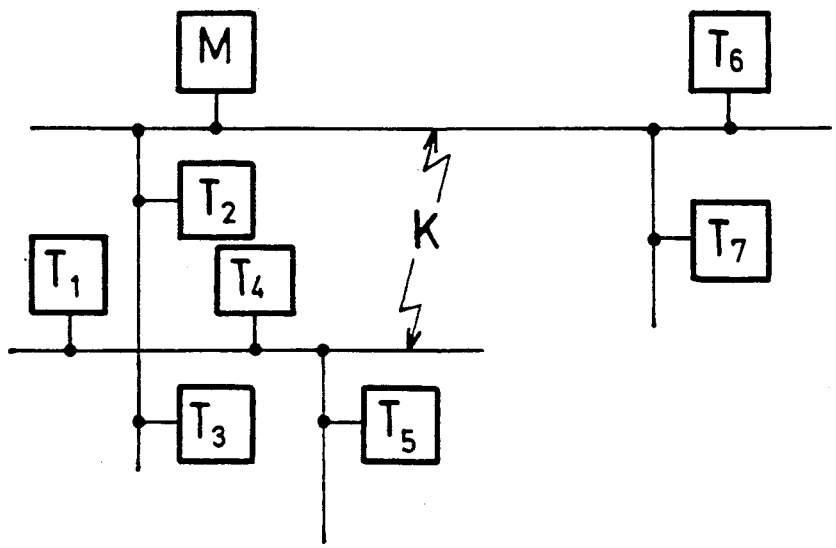
FIG. 1 shows a network having a master station, a plurality of subscriber stations and an energy supply system as a common data channel.

The reference symbols used in the drawing and their meanings are summarized in the List of Reference Symbols.

DESCRIPTION OF THE PREFERRED EMBODIMENTS

Referring now to the drawings, wherein like reference numerals designate identical or corresponding parts throughout the several views, FIG. 1 shows a network having a master station M and a plurality of subscriber stations T1,.., T7 which are interconnected by a common data channel K. The master station M controls the data exchange in the network. It issues instructions and requests data.

An electrical distribution system on the low-voltage and/or medium-voltage level is preferably used as a data channel. The master station M and the subscriber stations T1, . . . , T7 are, for example, transmitting-/receiving stations which are coupled to the electrical lines in switching systems and consumers and which are suitable for transmitting and receiving FH/PSK signals (FH=frequency hopping; PSK=phase shift keying). It is not necessary here for all stations to be located on the same voltage level. A system extending over both aforesaid voltage levels can be found, for example, in the initially cited EP-0,231,457. For details of signal transmission with FH/PSK signals, reference is made to the likewise initially cited published patent applications.

The object of the method according to the invention is to permit a reliably functioning controlled data exchange. This is achieved with a hierarchical token-passing principle with controlled assignment of a control token described below.

Figures 2A, 2B:
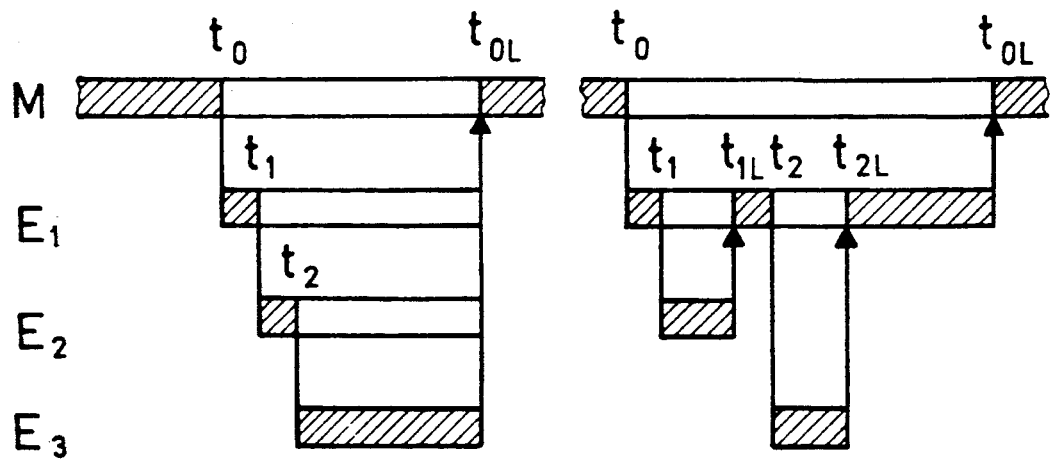
FIG. 2a, b shows a representation of the time sequence of the hierarchical token-passing principle according to the invention.

FIGS. 2a and 2b illustrate the temporal sequence of the method. At the start of each data exchange the master station M has sole possession of the control token (indicated by a hatching).

In FIG. 2a, the master station M sends a telegram (i.e. a data packet with an address header, containing intermediate and/or final addressees, as well as time limits, instructions etc.) with a time limit t0L to a first receiver E1 (subscriber station) at time t0 and simultaneously passes the control token on to said receiver.

Until expiry of its specified time limit t0L the receiver E1 now has complete control over the data channel for carrying out the instruction contained in the telegram. In the present example, it sends a telegram itself with the specified time limit t0L to a subordinate second receiver E2 at time t1 and passes on the control token to said receiver at the same time. In the same manner, the control token is passed on to a further, third receiver E3 subordinate to the second receiver E2, which then claims the remaining period available to it for itself.

After expiry of the time limit t0L, the control token reverts to the master station M again.

FIG. 2b shows another sequence which is likewise possible. The master station M again has sole possession of the control token at the start. Specifying a time limit t0L, it passes on said control token to the first receiver E1. The latter now itself defines a further time limit t1L and passes the control token on to the subordinate second receiver E2 with this specification.

The further time limit t1L may not here exceed the time limit t0L specified for the first receiver E1 itself. In the present example, it is dimensioned so that, after expiry of the time limit t1L specified by it, the latter can send a further telegram with a further time limit t2L out to a third receiver E3.

Once the control token has reverted from the third to the first receiver, the latter simply allows the time remaining to it to elapse. At time t0L, the master station again has sole control over the channel. The data exchange has finished.

In the two examples the data exchange is strictly controlled. Exactly one subscriber station (or the master station) always has the control token, and only the station with the control token is permitted to send out telegrams. All others listen. This ensures that no collisions occur on the common data channel. Data exchange controlled in this manner is called normal data traffic.

In addition to the normal data traffic, however, there are also so-called special calls. With these, the control token is no longer restricted to one receiver. It is therefore possible for two or more telegrams which were transmitted by various subscriber stations simultaneously on the data channel to collide with one another.

Figure 3:
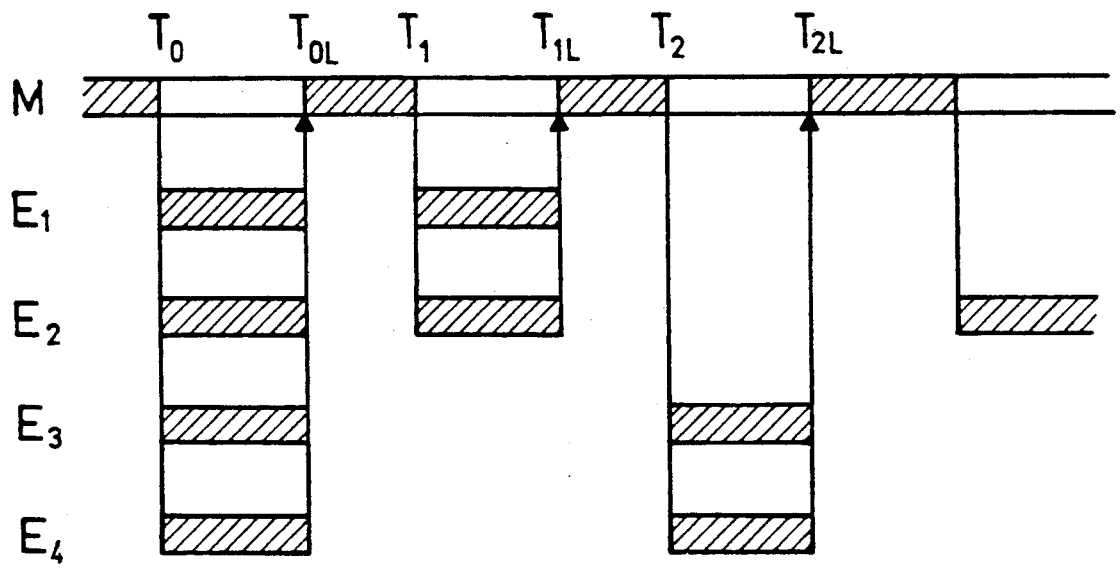
FIG. 3 shows a representation of the method for resolving collisions.

It will now be explained with reference to FIG. 3. how such collisions are resolved. At time t0, the master station M sends a special call, i.e. a telegram with a time limit t0L, which is addressed to an entire receiver group E1, . . . , E4. If the two receivers E2 and E3 now reply simultaneously, then the corresponding telegrams are overlaid on one another and can no longer be deciphered.

In general, it will not be possible for the master station M to determine how many receivers, or which receivers have replied It therefore divides the original receiver group E1, . . . , E4 into a first and a second sub-group E1, E2 and E3, E4 respectively. It then repeats the telegram separately for each sub-group.

In the present example, the collision is thereby resolved. The master station can now serve the receivers E2, E3 which replied to the special call in normal data traffic.

If collisions occur again after a first division of the receiver group into a sub-group, the sub-group itself is divided again. In this manner it is possible to disentangle multiple collisions successively.

After the subscriber stations whose reply has been registered have been served, the special call is preferably repeated. It is thus possible to ensure that a subscriber station which is weakly received is not missed. It is namely quite possible that a collision between a telegram having a great signal strength and one with a lower signal strength is not detected as such at all.

The special calls described are suitable, for example, for the alarm interrogation and for the incorporation of new subscriber stations.

It is quite within the scope of the invention if the master station delegates special calls. In FIG. 3, any subscriber station then takes the place of the master station. However, while the master station has any amount of time available for resolving any collisions, a time limit is of course specified for the representative subscriber station.

The above description can be summarized as follows:

1. The master station has complete control over the data channel. It can relinquish said control for a period defined by itself. After the expiry thereof, the master station again has sole control.

2. Each subscriber station which receives the control token has complete control over the data channel within its specified period. In particular, as sender it may relinquish the control token to another subscriber station.

A hierarchical structure is thereby defined The following possibilities exist on each level of the hierarchy:

a) The receiver registers the telegram and allows the specified time limit to expire without making use of the control token.

b) The receiver makes use of the control token, but does not relinquish it.

c) The receiver makes use of the control token and relinquishes it for a time which it determines, which may not exceed the time limit specified for the receiver itself, to a subordinate further receiver.

d) The receiver returns the control token, possibly together with any data (requests, information) to the master station.

A subscriber station is of course not restricted to the normal data traffic. It is quite possible for it to send out special calls also. An example of this would be the searching for new subscriber stations in a part of the network remote from the master station. In FIG. 3, then, a subscriber station provided with a sufficiently large time limit takes the place of the master station.

Preferred embodiments of the invention will now be described below. The intention here is to carry out the transmission of data packets in such a way that it is optimally matched to the characteristics of the data channel.

Figure 4:
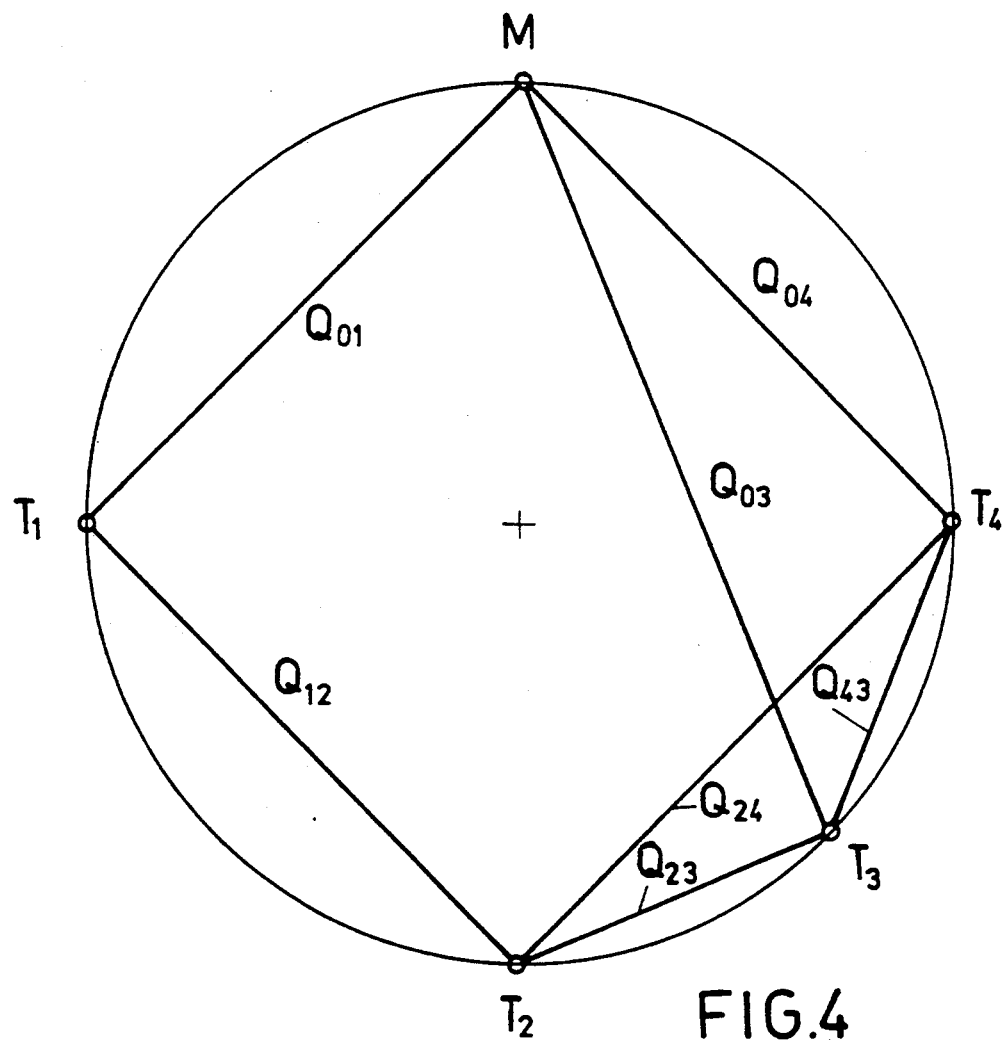
FIG. 4 shows a logical connection structure in a network having one master station and four subscriber stations.

FIG. 4 shows an example of a logical connection structure in a network having one master station M and four subscriber stations T1, ..., T4. Each line drawn in represents a possible direct connection.

In the present example, the master station M can communicate directly with the three subscriber stations T1, T3, T4. In contrast there is no direct connection to the subscriber station T2. Since this subscriber station T2 is directly connected to all other subscriber stations T1, T3, T4, however, the master station is able to use one of the three subscriber stations T1, T3, T4 as a relay and thus establish an indirect connection.

Each direct connection is characterized by its transmission quality $Q_{ij}$. A connection must have a minimum transmission quality for it to be accepted as such in the logical connection structure.

The master station calculates at least one data route for each subscriber station based on the transmission qualities $Q_{ij}$ prevailing in the network. This data route defines which subscriber stations (if any at all) are to be used as a relay when transmitting a data packet.

In the present example, the transmission runs directly between master station M and one of the three subscriber stations T1, T3, T4, and that between master station M and subscriber station T2 runs, for example, via the subscriber station T3. An alternative data route could run, for example, via the subscriber station T3.

The transmission quality is continuously monitored by each subscriber station. If it no longer meets the given criterion, the master station is notified of this.

In accordance with a preferred embodiment, for this purpose each subscriber station monitors the data traffic it can receive, registers the sender and the signal-to-noise ratio of a data packet as transmission quality, and notifies the master station of the corresponding values at the given time.

Alternatively, or additionally, the master station can in turn monitor each data route using a quality characteristic. If the quality characteristic no longer meets a given criterion, the master station calculates a new data route taking into account the transmission qualities registered by the subscriber stations.

A value suitable as quality characteristic is the average number of repeats of a data packet caused by interference.

A maximum number of repeats within, for example, the last hundred data packets transmitted to a particular subscriber station could then be used as criterion. A further value is, for example, the signal-to-noise ratio of the telegrams received.

It is of course also possible to suitably combine and weight several values for the quality characteristic.

The method according to the invention is thus characterized by the following steps:

a) Monitoring of the current data traffic and registration of the transmission quality to the master station and to the subscriber stations;

b) Notification of the transmission qualities registered to the master station;

c) Calculation of one or more data routes for each subscriber station;

d) Transmission of data packets in accordance with the data route.

The method according to the invention can advantageously be used for incorporating new subscriber stations in the existing network. This will be explained below with reference to FIG. 4.

In a first example, it is assumed that the subscriber station T3 is new. The master station thus only knows the three subscriber stations T1, T2, T4 and exchanges data packets only with these. However, the new subscriber station T3 monitors the current data traffic and registers with which transmission qualities $Q_{03}$, $Q_{13}$, $Q_{23}$, $Q_{43}$ the master station M or the subscriber stations T1, T2, T4 receive it.

At specified, regular or irregular intervals, the master station M checks whether new subscriber stations are to be incorporated in the existing network. For this purpose it makes a special call which is directed to all subscriber stations not incorporated.

A quality characteristic which qualifies the connection lying between master station and new subscriber station is transferred with the corresponding data packet. One possible embodiment here is that the quality characteristic characterizes the transmission quality of the connection prevailing between master station and the subscriber station which, representing the master station, carries out the special call in a remote part of the network.

If the quality characteristic transmitted meets a given criterion, the new subscriber station replies to the special call and notifies the master station M of the transmission qualities $Q_{03}$, $Q_{13}$, $Q_{23}$, $Q_{43}$ registered.

The master station M integrates the new subscriber station T3 into the logical connection structure by defining at least one data route based on the transmission qualities $Q_{03}$, $Q_{13}$, $Q_{23}$, $Q_{43}$. The operation is then complete.

If a special call of the master station remains unanswered, there are, apart from the trivial case where there is just no new subscriber station to be incorporated, two possibilities:

1. The quality characteristic does not meet the given criterion, or

2. The new subscriber station was unable to hear the special call.

In order to handle these two cases, the master station must delegate the special call to a subscriber station. In the case of a delegated special call, the quality characteristic contains the transmission quality between master station and representative subscriber station.

If in FIG. 4, for example, the subscriber station T2 is to be incorporated, the master station must delegate the special call to, for example, the subscriber station T3. The quality characteristic then contains the transmission quality $Q_{03}$ of the corresponding connection. When checking the quality characteristic, the new subscriber station T2 can also incorporate in particular the transmission quality $Q_{23}$ registered by it.

In the existing network, each subscriber station is identified by a short network address. Since a new subscriber station does not yet have one of these, it replies to a special call preferably with a globally unique, and hence correspondingly long, serial number. As soon as it then has a network address, it disregards the special calls for incorporation sent out at regular or irregular intervals.

In summary it can be said that the invention provides a flexible method for the efficient transmission of data packets, which is particularly suited to control systems on low-voltage and/or medium-voltage systems.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method of exchanging data in the form of telegrams in a network having a master station, at least one subscriber station and a common data channel according to a hierarchical token-passing principle with controlled assignment of a control token, wherein
   a) at the start of a data exchange the master station has sole possession of the control token,
   b) wherein in order to initiate the data exchange the master station sends a telegram with a time limit specified by it to at least one receiver,
   c) wherein said at least one receiver accepts the control token for a period limited by the specified time limit,
   d) wherein said at least one receiver and each subordinate further receiver
   d1) either passes as sender the control token with a telegram and a further time limit not exceeding the specified time limit on to a subordinate further receiver,
   d2) or allows the specified time limit to expire without relinquishing the control token,
   d3) or returns the control token to the sender or to the master station,
   e) and wherein, after expiry of the time limit specified by it, the master station again accepts sole possession of the control token.

2. The method as claimed in claim 1, wherein, in order to avoid collisions during normal data traffic, the control token is passed on to only exactly one receiver, and wherein, in order to resolve collisions during a special call, an original receiver group is divided into a plurality of sub-groups and the control token is successively relinquished to the individual sub-groups of the receiver group.

3. The method as claimed in claim 2, wherein special calls are used for incorporating new subscriber stations in the network and for an alarm interrogation.

4. The method as claimed in claim 2, wherein the original receiver group is divided into two sub-groups.

5. The method as claimed in claim 3, wherein, during incorporation, the new subscriber stations are identified by a globally unambiguous serial number, and wherein a group of addressed serial numbers is divided during the division of the original receiver group.

6. The method as claimed in claim 1, wherein
   a) at least one of the subscriber stations registers the telegrams it can receive and in each case a value for determining a transmission quality,
   b) wherein at least this one of the subscriber stations notifies the master station of the transmission qualities registered,
   c) wherein, on the basis of the transmission qualities notified to it, the master station defines at least one data route for at least one of the subscriber stations,
   d) and wherein telegrams destined for at least one of the subscriber stations are transmitted in accordance with the defined data route.

7. The method as claimed in claim 6, wherein
   a) a new subscriber station to be incorporated in the network registers in an unincorporated state the telegrams it can receive and in each case a value for indicating a transmission quality of these telegrams,
   b) for incorporating the new subscriber station, the master station sends out a special call containing a quality characteristic for the connection lying between master station and new subscriber station, and
   c) wherein this new subscriber station only replies to the special call and notifies the master station of the transmission qualities registered if the quality characteristic meets a given criterion.

8. The method as claimed in claim 6, wherein the master station checks the transmission quality from time to time.

9. The method as claimed in claim 8, wherein the transmission quality is checked on the basis of an average number of repeats caused by interference.

10. The method as claimed in claim 1, wherein the lines of an electrical power distribution system are used as a common data channel, and wherein FH/PSK signals are used for the data exchange.

* * * * *